(12) United States Patent
Melzani

(10) Patent No.: US 10,050,776 B2
(45) Date of Patent: Aug. 14, 2018

(54) METHOD FOR PERFORMING A SENSITIVE DATA ENCRYPTION WITH MASKING, AND CORRESPONDING ENCRYPTION APPARATUS AND COMPUTER PROGRAM PRODUCT

(71) Applicant: STMicroelectronics S.r.l., Agrate Brianza (IT)

(72) Inventor: Filippo Melzani, Burago di Molgora (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 140 days.

(21) Appl. No.: 15/064,339

(22) Filed: Mar. 8, 2016

(65) Prior Publication Data

US 2017/0033923 A1  Feb. 2, 2017

(30) Foreign Application Priority Data

Jul. 31, 2015  (IT) .................. 102015000040966

(51) Int. Cl.
- *G06F 21/72*  (2013.01)
- *H04L 9/00*  (2006.01)
- *G06F 7/58*  (2006.01)

(52) U.S. Cl.
CPC .............. *H04L 9/005* (2013.01); *G06F 7/588* (2013.01); *H04L 9/003* (2013.01); *H04L 2209/046* (2013.01); *H04L 2209/34* (2013.01)

(58) Field of Classification Search
CPC ..... H04L 9/002; H04L 9/0631; H04L 9/0625; G06F 21/562

(Continued)

(56) References Cited

U.S. PATENT DOCUMENTS 8,091,139 B2 * 1/2012 Klimov ............... G06F 21/556
  380/252
8,774,406 B2 * 7/2014 Choi .................. H04L 9/002
  380/206

(Continued)

FOREIGN PATENT DOCUMENTS

WO  2014/092533 A1  6/2014

OTHER PUBLICATIONS

Eric Peeters, Improved High Order Side channel attacks with FPGA Experiments, 2005, pp. 321-335.*

(Continued)

*Primary Examiner* — Morshed Mehedi
*Assistant Examiner* — Viral S Lakhia
(74) *Attorney, Agent, or Firm* — Seed IP Law Group LLP

(57) ABSTRACT

Cryptographic circuitry masks sensitive data values. The masking includes extracting unique combinations of random mask values from one or more sets of random mask values. Each sensitive data value is masked using a respective unique combination. The unique combinations have a combination class greater than or equal to a determined integer corresponding to a protection-level against side-channel attacks, and a number of unique combinations greater than or equal to a number of the sensitive data values. A number of random mask values in the one or more sets of random mask values is based on the number of unique combinations and the class of the plurality of unique combinations.

25 Claims, 4 Drawing Sheets

(58) Field of Classification Search
USPC ............ 713/182–189; 380/277, 28, 30, 252; 726/5
See application file for complete search history.

(56) References Cited

U.S. PATENT DOCUMENTS

| | | | | |
|---|---|---|---|---|
| 8,831,228 | B1* | 9/2014 | Agrawal | H04L 9/0822 380/277 |
| 9,143,325 | B2* | 9/2015 | Chen | G06F 7/724 |
| 9,288,040 | B2* | 3/2016 | Endo | H04L 9/003 |
| 2007/0174916 | A1* | 7/2007 | Ching | G06F 21/602 726/24 |
| 2010/0287386 | A1* | 11/2010 | Feix | H04L 9/002 713/193 |
| 2010/0322412 | A1* | 12/2010 | Hung | G06F 7/726 380/28 |
| 2011/0055591 | A1* | 3/2011 | Rivain | H04L 9/003 713/189 |
| 2012/0045061 | A1* | 2/2012 | Danger | H04L 9/003 380/277 |
| 2012/0288085 | A1* | 11/2012 | Li | H04L 9/0631 380/28 |
| 2013/0243191 | A1* | 9/2013 | Komano | H04L 9/0861 380/44 |
| 2014/0044265 | A1* | 2/2014 | Kocher | H04L 9/083 380/277 |
| 2015/0110266 | A1* | 4/2015 | Debraize | H04L 9/003 380/30 |
| 2015/0169904 | A1* | 6/2015 | Leiserson | G06F 21/558 713/189 |
| 2015/0172042 | A1* | 6/2015 | Karroumi | G06F 7/727 380/28 |
| 2015/0222421 | A1* | 8/2015 | Guo | H04L 9/003 380/28 |
| 2015/0229220 | A1* | 8/2015 | Lee | H02M 1/32 363/21.03 |
| 2015/0270967 | A1* | 9/2015 | Susella | H04L 9/3093 380/30 |
| 2016/0314300 | A1* | 10/2016 | Sethumadhavan | G06F 21/57 |

OTHER PUBLICATIONS

Guillaume Fumaroli, Affine masking against High Oder Side channel analysis, International Workshop Cryptography, 2010, pp. 262-280.*

"Announcing the Advanced Encryption Standard (AES)," Federal Information Processing Standards Publication 197, Nov. 26, 2001, 51 pages.

* cited by examiner

US 10,050,776 B2

METHOD FOR PERFORMING A SENSITIVE DATA ENCRYPTION WITH MASKING, AND CORRESPONDING ENCRYPTION APPARATUS AND COMPUTER PROGRAM PRODUCT

BACKGROUND

Technical Field

The present disclosure regards techniques for performing an encryption method that envisages performing a masking on the sensitive data.

Description of the Related Art

In the encryption sector it is in general known, in order to retrieve the key, in particular of symmetric-key block encryption algorithms, such as the AES algorithm, but also of non-symmetric public-key algorithms, to use so-called "side-channel" attacks, e.g., attacks that exploit the information that can be derived, through a process of so-called "leakage" of information, from the physical implementation of the encryption procedure, for example by measuring energy-absorption levels of the circuit.

It is known, for example, to use as countermeasure against side-channel attacks operations of linear, Boolean, masking of the data.

According to the above technique, each datum is masked via a Boolean XOR operation with mask values.

In general, a side-channel attack is said to be of d-th order if it requires considering statistical moments of order d to distinguish the correct hypotheses from the wrong ones.

Several of the countermeasures against such side-channel attacks exploit, for example, the presence of look-up tables (LUTs) in the circuits that implement the algorithms, and operations of initialization of the values contained in these tables are carried out. Look-up tables, also known as "association tables", are data structures that facilitate association to each admissible combination of input data of a corresponding (not necessarily unique) configuration of output data. Normally, the use of a look-up table makes it possible to speed up the operations in so far as access to the datum in the table is faster than its calculation. Look-up tables are hence frequently used in encryption algorithms, whether hardware or software ones, for carrying out complex calculations. For example, a look-up table, the so-called Substitution Box (SBOX), is used in the known AES (Advanced Encryption Standard) encryption algorithm for implementing operations such as, for example, the SubBytes operation.

FIG. 1A shows a flowchart representing an implementation 200 of the AES encryption procedure. The steps represented constitute the steps for encryption of a 16-byte block, known as AES state. This procedure 200, as likewise the detail of the operations 210, 220, 230, 240, are in themselves known to the person skilled in the sector (see, for example: NIST, "Announcing the Advanced Encryption Standard (AES)," FIPS-197 (Nov. 26, 2001))

Since it is advantageous from the standpoint of management of Boolean masking to separate the non-linear part (corresponding to the SBOX) from the linear parts, the AES state to be encrypted, designated by A, is for example subjected to a first SubBytes operation 210, to supply at output a state B, which is subjected to a set 220 of operations ShiftRows+MixColumns+AddKey, to generate a state C. The operations 210, 220 correspond to a first round. Then, in a next round, a second SubBytes operation 230 is carried out, to obtain a state D, as well as a further set 240 of operations ShiftRows+MixColumns+AddKey, to generate a state E. A number of rounds that is envisaged by the procedure 200 and depends upon the number of corresponding round subkeys to be added is carried out. The various modalities of management of the AES rounds are in any case in themselves known to the person skilled in the sector. As has been said, the SubBytes operation 210 or 230, which contains a non-linear portion, is carried out with the aid of a Substitution Box (SBOX), which comprises a look-up table.

At the end of the AES encryption procedure 200, the masks are removed from the ciphertext that is the product of the AES encryption procedure 200.

Represented in FIG. 1B are the masks applied by the method with reference to the very same encryption procedure 200 of FIG. 1A.

For the input of the SBOX (input for sixteen 1-byte elements of the ABS state) input masks L are provided for masking in the first round (steps 210-220) and input masks N are provided for masking in the second round (steps 230-240). Output masks M of the SBOX are provided for masking in the first round (steps 210-220) and output masks O are provided for masking in the second round (steps 230-240).

The so-called high-order side-channel attacks attack different points of the algorithm that use the same mask values so as to be able to remove the protection of the mask. In general, given a mask, the initialization of the look-up table with this mask and the access to the masked data during calculation means having at least two different operations in two different instants in time that use the same mask, the corresponding attack thus being a second-order attack.

In this context, the countermeasures for high-order attacks are usually complex and are very penalizing in terms of latency time and circuit area required for their implementation. In addition, in hardware implementations the protection level is defined in the design stage since this affects the design itself and, as has been said, the area of the circuit to be designed. This constitutes a further complexity and drawback.

In order for the countermeasure to be effective, the masks generally present certain properties: for example, they are unknown to the hacker, are randomly extracted with uniform distribution, and are independent of one another.

A possibility, which may provide the best protection, is to use masks that are all independent of one another, produced by a true-random number generator (TRNG). However, generation of a large amount of values by a TRNG is slow. The large number of values is particularly critical for encryption operations carried out in constrained devices, such as smartcards. The storage space for the masks may easily reach ten times the space occupied by the actual data.

In general, TRNGs presuppose an entropy source based upon some unpredictable physical phenomenon. It is alternatively possible to use masks that appear independent of one another, produced by a pseudo-random number generator (PRNG). In order for the generation to be effectively faster and able to withstand the high demand for random values, this typically requires a dedicated hardware pseudo-random number generator. Moreover, it is difficult to evaluate the side-channel leakages associated to the above pseudo-random number generator, which could introduce new side-channel vulnerabilities.

In addition, in order to reduce the number of true random values, it is possible to reuse some masks that are to be applied to intermediate values. However, this may jeopardize the level of protection.

BRIEF SUMMARY

In an embodiment, a method comprises: masking, using cryptographic circuitry, sensitive data values by: extracting, from at least one set of random mask values, a plurality of unique combinations of random mask values; and masking each sensitive data value using a respective combination of the plurality of unique combinations of random mask values, the plurality of unique combinations having: a class greater than or equal to a determined integer corresponding to a protection-level against side-channel attacks; and a number of unique combinations greater than or equal to a number of the sensitive data values, wherein a number of random mask values in the at least one set of random mask values is based on the number of unique combinations and the class of the plurality of unique combinations. In an embodiment, the at least one set of random mask values comprises a plurality of distinct sets of random mask values. In an embodiment, the method comprises extracting a plurality of unique combinations having a distance from one another greater than or equal to the determined integer minus one. In an embodiment, the method comprises using distinct sets of random mask values for different mask positions in the unique combinations. In an embodiment, the method comprises: dividing a pool of random mask values into a number of distinct partitions greater than or equal to half the determined integer plus one; and including mask values from first, second and third distinct partitions in the unique combinations, wherein pairs of masks values from the second partition and the third partition are not reused in the unique combinations. In an embodiment, the method comprises: dividing a pool of random mask values into a number of distinct partitions greater than or equal to half the determined integer plus one, wherein extracting a unique combination of random mask values comprises: selecting a mask value from the first partition to include in the unique combination; selecting a mask value from the second partition to include in the unique combination; and for each non-trivial partition of the distinct partitions after the first partition and the second partition, selecting a mask value in the non-trivial partition to include in the unique combination, the mask value having a position index in the non-trivial partition based on a base cyclic permutation having a cycle length equal to a prime number greater than or equal to a maximum between a size of the first partition and a size of the second partition. In an embodiment, the method comprises: selecting additional mask values to include in the unique combination from trivial partitions. In an embodiment, the base cyclic permutation is a rotation by one position. In an embodiment, the method comprises: dividing a pool of random mask values into a number of distinct partitions, wherein a product of a number of values of a first partition and a number of values of a second partition is greater than or equal to the number of the sensitive data values. In an embodiment, said sensitive-data values comprise state bytes for each round and step of an encryption procedure. In an embodiment, said encryption procedure is an Advanced Encryption Standard (AES) encryption procedure including at least one first set of random mask values, which corresponds to intermediate masks that may be the same for all bytes of a state and applied in the intermediate steps of the AES rounds, and at least one second set of random mask values, each value corresponding, according to an index, to the bytes of the AES state.

In an embodiment, an apparatus comprises: one or more memories; and cryptographic circuitry, which, in operation, processes sensitive data values, the processing including: extracting, from at least one set of random mask values, a plurality of unique combinations of random mask values; and masking each sensitive data value using a respective combination of the plurality of unique combinations of random mask values, the plurality of unique combinations having: a class greater than or equal to a determined integer corresponding to a protection-level against side-channel attacks; and a number of unique combinations greater than or equal to a number of the sensitive data values, wherein a number of random mask values in the at least one set of random mask values is based on the number of unique combinations and the class of the plurality of unique combinations. In an embodiment, the at least one set of random mask values comprises a plurality of distinct sets of random mask values. In an embodiment, the cryptographic circuitry, in operation, extracts a plurality of unique combinations having a distance from one another greater than or equal to the determined integer minus one. In an embodiment, the cryptographic circuitry, in operation, uses distinct sets of random mask values for different mask positions in the unique combinations. In an embodiment, the cryptographic circuitry, in operation: divides a pool of random mask values into a number of distinct partitions greater than or equal to half the determined integer plus one; and includes mask values from first, second and third distinct partitions in the unique combinations, wherein pairs of masks values from the second partition and the third partition are not reused in the unique combinations. In an embodiment, the cryptographic circuitry, in operation: divides a pool of random mask values into a number of distinct partitions greater than or equal to half the determined integer plus one, wherein extracting a unique combination of random mask values comprises: selecting a mask value from the first partition to include in the unique combination; selecting a mask value from the second partition to include in the unique combination; and for each non-trivial partition of the distinct partitions after the first partition and the second partition, selecting a mask value in the non-trivial partition to include in the unique combination, the mask value having a position index in the non-trivial partition based on a base cyclic permutation having a cycle length equal to a prime number greater than or equal to a maximum between a size of the first partition and a size of the second partition. In an embodiment, said processing comprises application of an Advanced Encryption Standard (AES) encryption.

In an embodiment, a system comprises: one or more integrated circuits; and cryptographic circuitry, which, in operation, processes sensitive data values, the processing including: extracting, from at least one set of random mask values, a plurality of unique combinations of random mask values; and masking each sensitive data value using a respective combination of the plurality of unique combinations of random mask values, the plurality of unique combinations having: a class greater than or equal to a determined integer corresponding to a protection-level against side-channel attacks; and a number of unique combinations greater than or equal to a number of the sensitive data values, wherein a number of random mask values in the at least one set of random mask values is based on the number of unique combinations and the class of the plurality of unique combinations. In an embodiment, one of the one or more integrated circuits includes the cryptographic circuitry. In an embodiment, at least one of the one or more integrated circuits, in operation, provides set-top-box functionality. In an embodiment, the cryptographic circuitry, in operation: divides a pool of random mask values into a number of distinct partitions greater than or equal to half the determined integer plus one; and includes mask values from first, second and third distinct partitions in the unique combinations, wherein pairs of masks values from the second partition and the third partition are not reused in the unique combinations. In an embodiment, the at least one set of random mask values is stored in a look-up table.

In an embodiment, a non-transitory computer-readable medium's contents configure cryptographic circuitry to process sensitive data, the processing of the sensitive data comprising: extracting, from at least one set of random mask values, a plurality of unique combinations of random mask values; and masking each sensitive data value using a respective combination of the plurality of unique combinations of random mask values, the plurality of unique combinations having: a class greater than or equal to a determined integer corresponding to a protection-level against side-channel attacks; and a number of unique combinations greater than or equal to a number of the sensitive data values, wherein a number of random mask values in the at least one set of random mask values is based on the number of unique combinations and the class of the plurality of unique combinations. In an embodiment, the plurality of unique combinations have a distance from one another greater than or equal to the determined integer minus one. In an embodiment, the processing the sensitive data comprises: dividing a pool of random mask values into a number of distinct partitions greater than or equal to half the determined integer plus one; and including mask values from first, second and third distinct partitions in the unique combinations, wherein pairs of masks values from the second partition and the third partition are not reused in the unique combinations.

Various embodiments relate to methods which may facilitate addressing some of the problems discussed herein. Various embodiments may refer also to an apparatus as likewise to a computer program product, which can be loaded into the memory of at least one computer (e.g., a terminal in a network) and comprises portions of software code that are able to execute the steps of a method when the program is run on at least one computer. As used herein, this computer program product is understood as being equivalent to a computer-readable medium containing instructions for controlling the computer system so as to co-ordinate execution of a method described herein. Reference to "at least one computer" is meant to emphasize the possibility of an embodiment described herein being implemented in a modular and/or distributed form.

Various embodiments may envisage use in an SBOX for ABS encryption. Various embodiments may envisage use of the method in an apparatus comprised in a set-top box and/or in a smartcard.

In an embodiment, an encryption method comprises performing an encryption procedure, which includes operations of masking of sensitive-data values, applying random mask values to said sensitive-data values, said method being characterized in: generating or making available at least one set of random mask values; extracting from said at least one set of random mask values a plurality of unique combinations of said random mask values; and applying each unique combination as mask to a respective value of sensitive data to be protected, the class of said plurality of combinations being greater than or equal to a desired level of protection from side-channel attacks and a number of said mask values in said at least one set being such as to be able to generate from said values a number of unique combinations of said same given class that is greater than or equal to the number of the sensitive data to be protected. In an embodiment, said operation of generating or making available at least one set of random mask values comprises using a number of distinct sets of random values. In an embodiment, the method comprises extracting a plurality of unique combinations having a distance from one another that is greater than or equal to the desired protection level minus one. In an embodiment, the method comprises generating or making available distinct sets of random mask values for different mask positions in the combinations, so that, in order to remove all the masks, a number of leakage operations will be required that is greater than the desired protection level. In an embodiment, said operation of generating or making available distinct sets of random mask values for different mask positions in the combinations comprises: dividing a pool of random values into a number of distinct partitions such that said number is greater than or equal to half the protection level plus one; generating a number of unique combinations such that, for all the combinations of masks that have in common one and the same mask value of a first partition from said partitions, except for the first mask value of said first partition, if the remaining mask values for the remaining partitions are taken in pairs from different partitions, in each of said pairs the two values will have a different position index. In an embodiment, said operation of generating a number of unique combinations comprises: selecting a base cyclic permutation with a given cycle length that is equal to a prime number greater than or equal to the maximum between the size of the first partition and the size of the second partition; generating all the combinations of the values of the first partition and second partition; defining each further partition with index up to the number of independent partitions via a permutation applied on the second partition that is generated starting from the cyclic permutation and depends upon the index of the first mask value and upon the index of the partition; and extracting any possible further masks from one-element partitions. In an embodiment, the method comprises selecting as a base cyclic permutation the rotation to the left or to the right by one position. In an embodiment, selecting the number of values of the first partition and the number of values of the second partition such that their product is greater than or equal to the number of sensitive data to be protected. In an embodiment, the sensitive-data values comprise the state bytes for each stage of the encryption procedure, in particular for each round and step of the encryption procedure. In an embodiment, said encryption procedure is an Advanced Encryption Standard (AES) encryption procedure that includes at least one first set of random mask values, which corresponds to the intermediate masks that may be the same for all the bytes of the state and are applied in the intermediate steps of the AES rounds, and at least one second set of random mask values, each value corresponding, according to the index, to the bytes of the AES state. In an embodiment, an encryption apparatus is configured to perform an encryption procedure as disclosed herein. In an embodiment, said encryption procedure is an Advanced Encryption Standard (AES) encryption procedure and said look-up table is comprised in a device of an SBOX type. In an embodiment, the apparatus comprises a set-top box and/or in a smartcard. In an embodiment, a computer program product that can be loaded into the memory of at least one computer comprises portions of software code that are able to execute the steps of a method as disclosed herein.

BRIEF DESCRIPTION OF THE SEVERAL VIEWS OF THE DRAWINGS

Various embodiments will now be described, purely by way of example, with reference to the annexed drawings, wherein.

DETAILED DESCRIPTION

In the ensuing description numerous specific details are illustrated to facilitate understanding of the embodiments provided by way of example. The embodiments may be implemented with or without specific details, or else with other methods, components, materials, etc. In other circumstances, well-known structures, materials, or operations are not shown or described in detail so that aspects of the embodiments will not be obscured. Reference, in the course of this description, to "an embodiment" or "one embodiment" means that a particular structure, peculiarity, or characteristic described in connection with the embodiment is comprised in at least one embodiment. Hence, phrases such as "in an embodiment" or "in one embodiment" that may be present in various points of this description do not necessarily refer to one and the same embodiment. Moreover, the particular structures, peculiarities, or characteristics may be combined in any convenient way in one or more embodiments.

The notation and references used herein are provided only for convenience of the reader and do not define the scope or the meaning of the embodiments.

An embodiment described herein envisages in general use, for protecting a sensitive-data value belonging to a set of sensitive-data values, of a combination of true random masks taken from a set of masks the number of which is greater than or equal to the desired protection level. Each combination associated to a given sensitive-data value differs at least for one mask from each of the combinations of masks associated to the other sensitive data. In other words, an embodiment described herein may facilitate reduction or minimization of the number of true random masks to ensure a desired level of protection.

Figure 1B:
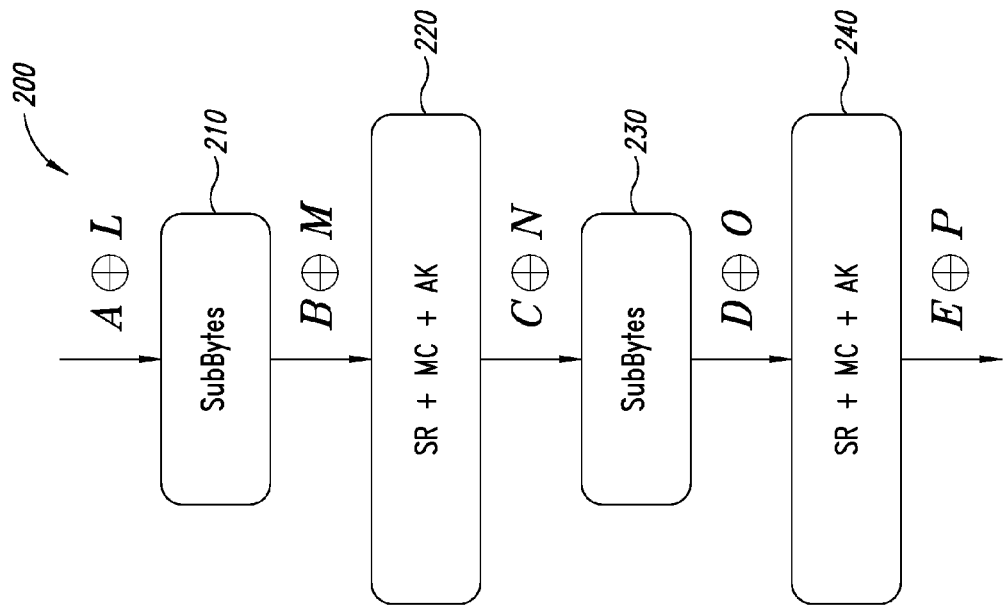
FIGS. 1A and 1B show block diagrams illustrating AES encryption operations.
Figure 2:
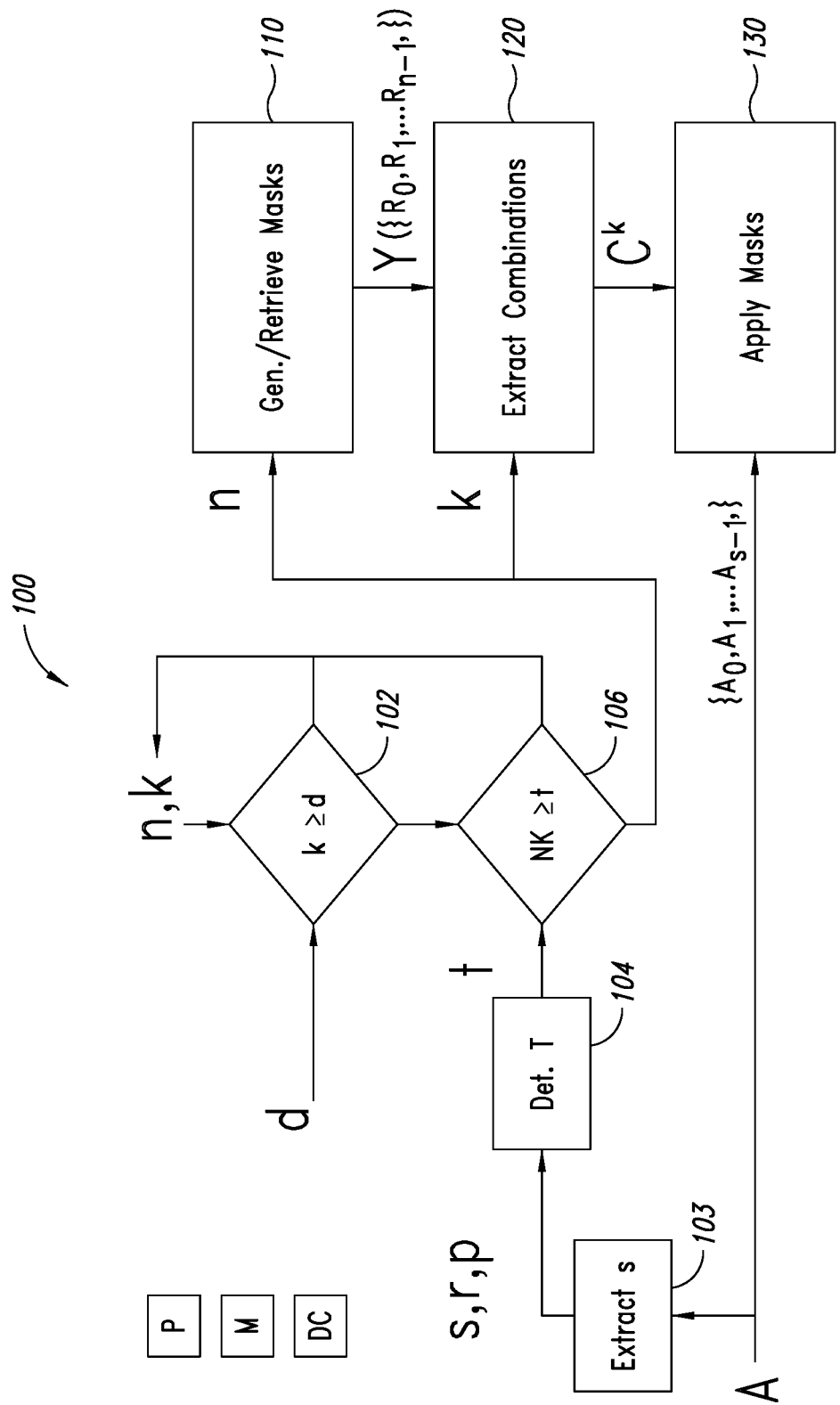
FIG. 2 shows a flowchart illustrating an embodiment of an encryption method described.

In particular, FIG. 2 shows a flowchart representing an embodiment of an encryption method described, which envisages performing an encryption procedure, such as for example the procedure 200 described with reference to FIG. 1B, that comprises operations of masking of sensitive-data values by applying random mask values—which in FIG. 2 are in general denoted by the set of random values $\{R_0, R_1, \ldots, R_{n-1}\}$, the generic element of which is $R_j$, the subscript j representing the position index of the set of values—to the sensitive-data values, which are designated as a whole by A. A set of sensitive-data values A, for example the initial AES state, comprises a number of bytes $A_1$ where 1 is the position index in the state. In the case of the AES state, the bytes are a number s of values of the state equal to 16, and hence the position index 1 ranges from 0 to s−1, e.g., 15.

Designated by 110 is a step of generating and/or making available a set of random mask values Y, specifically the set $\{R_0, R_1, \ldots, R_{n-1}\}$. The number n of these random values in the set $\{R_0, R_1, \ldots, R_{n-1}\}$ is such as to enable generation of a number $$\binom{n}{k}$$

of unique combinations $C^k$ of one and the same given class k (e.g., combinations formed by k elements) from among the random values in the set $\{R_0, R_1, \ldots, R_{n-1}\}$. The combinations $C^k$ of masks may be seen as words of fixed length of k symbols, where repetition of a symbol within one and the same word does not occur. The alphabet of symbols of the combinations is the first set of random values.

Step 110 envisages generating and/or making available the above random mask values Y. In fact, as described in the examples illustrated in what follows, the random values may be in sets generated, in particular during the encryption operations, or else in sets of random values already available, for example the mask values for the intermediate steps L, M, N, O indicated in FIG. 1B, or else in distinct sets purposely generated and already available for other reasons.

The random values Y may be:
pre-generated and then simply made available in step 110; or else
be generated just before they become necessary, during masking of the values, hence basically in step 110; or else
be derived from other random values already used for convenience of the evolution of the masks during the algorithm, hence derived before step 110, which hence makes them available, or during step 110.

In a subsequent step 120, it is then envisaged to extract from the set of random mask values Y, specifically the set $\{R_0, R_1, \ldots, R_{n-1}\}$, a plurality of unique combinations $C^k$ of these random mask values.

Hence, steps 110 and 120 determine a pair of values n, k, respectively. In FIG. 2 the determination process is represented by the operations 102-106.

The encryption method described herein envisages satisfying a first condition of protection wherein the class k of the aforesaid plurality of combinations $C^k$ is greater than or equal to a desired or determined level of protection d from side-channel attacks. Block 102 represents evaluation of the first condition of protection.

Given the first condition of protection that determines the class k, a corresponding condition is evaluated on the number n of the random values of the set $\{R_0, R_1, \ldots, R_{n-1}\}$. The number n is such as to be able to generate a number NK, expressed by the binomial coefficient $$\binom{n}{k},$$

of unique combinations $C^k$ of the same given class k that is greater than or equal to a number t of sensitive data to be protected. Designated by 106 is the step of evaluation of this condition on the number n of random values, namely, NK≥t.

Figure 1A:
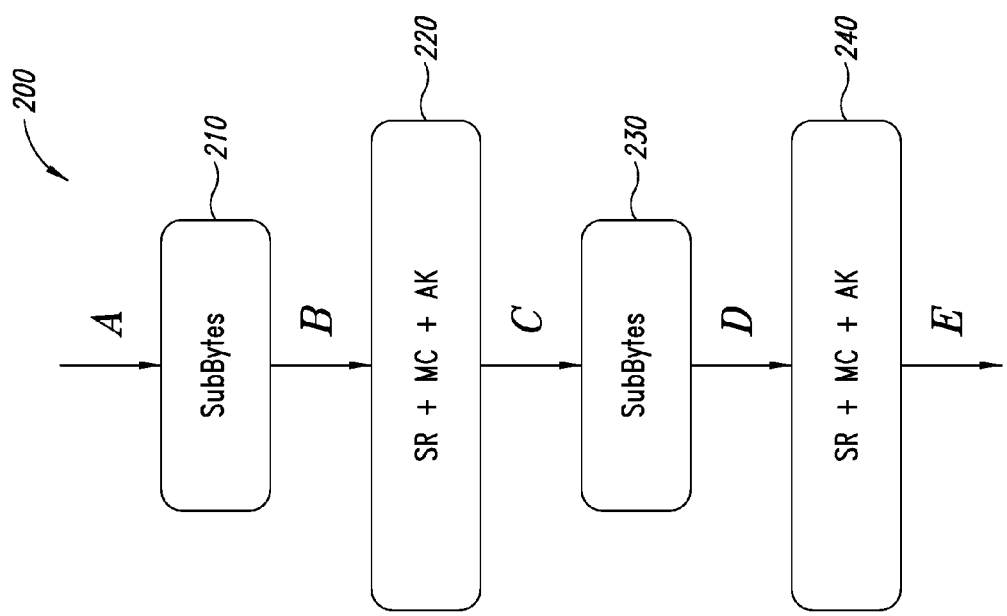

The number t of sensitive data to be protected is determined on the basis of the encryption procedure to be protected, in the example described herein starting from the state A. With reference to FIG. 1A-1B, the state A has a number s of values, which can be extracted in a step 103. If the operation to be protected operates just once, with just one step the number t of the sensitive data to be protected is equal to the number s of the bytes of the state A, e.g., for example 16 in the case of ABS. However, in general, the encryption operations such as those of the procedure 200 comprise a plurality of stages, which include a plurality of rounds r and a plurality of intermediate steps p. Hence, in a step 104, the number of values t is calculated as product of the number s of bytes, of the number nr of rounds r and of the number np of steps p, e.g., t=s·nr·np. In general, the number of steps np depends upon the specific implementation. As discussed in what follows, in the ABS encryption there may be, for example, nr=10 rounds and np=2 intermediate steps, hence V=16·10·2=320 bytes. Steps 103 and 104 to obtain the number t of values may be in general optional if the number t of values is known or in any case may be different if the number t of values is not calculated in terms of number s of bytes, of the number nr of rounds r, and of the number np of steps p.

As regards the number n of the random values of the set $\{R_0, R_1, \ldots, R_{n-1}\}$, the condition referred to above indicates its lower limit as a function of the class k; e.g., the number n of the random values is such that the number $$\binom{n}{k}$$

of unique combinations $C^k$ is greater than or equal to the number t of the sensitive data to be protected (step 106).

The upper limit of the value of the number n of the random values of the set Y may be identified as a function of the time of generation of the random values and of the space for storage of the random values.

Also for the class k the value chosen takes into account the latency in execution of the protection scheme. Each mask may be calculated for this purpose separately.

Once the above number NK of unique combinations $C^k$ has been obtained, a step 130 is envisaged of application of a different unique combination $C^k$ as mask to each respective sensitive-data value $\{A_0, A_1 \ldots, A_{s-1}\}_{r,p}$ to be protected for each stage, e.g., for each round r and each step p of the encryption procedure 200, as mentioned previously. For example, as illustrated in Table 1 appearing hereinafter, for the sensitive-data value $A_0$ at the first round and at the first step we shall have $A_0 \oplus R_0 \oplus R_1 \oplus R_2 \oplus R_3 \oplus R_4$.

To illustrate the method 100 described with reference to FIG. 2, as a first example, an example of protection of the AES state against second-order attacks is now described.

Using completely independent masks according to the techniques of the known art, since, as has been mentioned, there are 320 bytes of sensitive values to be protected, 16 state bytes, and at least 2 intermediate values per round, with 10 rounds (or 12 or 14 according to the size of the key), at least 2 masks are necessary for each sensitive value in order to obtain a second-order protection level. Hence, to protect 16 data bytes of the state A there would normally be necessary t·2 random values, e.g., 320·2=640 bytes.

Using an embodiment of the solution described herein, which adopts combinations of masks taken from a set of random-value masks $\{R_0, R_1, \ldots, R_{n-1}\}$, given a number t equal to 320 of bytes of sensitive values to be protected, at least 320 unique combinations $C^k$ are necessary, and hence the value of the binomial coefficient $$\binom{n}{k}$$

is greater than or equal to 320. To obtain a level of protection from second-order side-channel attacks, d=2, it is necessary to satisfy the condition (see step 102 of FIG. 2 that imposes the first protection condition) that the class k be greater than or equal to 2. For example, setting k=5 for step 120 and n=11 for step 110, the binomial coefficient is $$\binom{11}{5} = 462.$$

In other words, with only 11 bytes of random values we obtain a second-order protection.

Hence, in the example of AES implementation it is envisaged to provide (step 110) a set of random-value masks $\{R_0, R_1, \ldots, R_{n-1}\}$ comprising a number n of random values that is equal to 11; consequently, in the example, there is a set of 11 values $R_0, R_1, \ldots, R_{10}$. Each sensitive value $A_1$ is protected by a number k, in the example 5, of masks.

Table 1 below shows an example of the combinations $C^k$ generated in step 120. The rows indicate the round r and the intermediate step p of the round in an SBOX as illustrated in FIG. 1B, for example "Round 1, SBOX in", the columns indicate the bytes of the state: Byte0, $A_0$; Byte1, $A_1$; etc. Appearing in each cell of Table 1 is the corresponding different unique combination $C^k$ of k masks applied to the byte of the state A. For simplicity, only some combinations that are all unique are listed by way of example.

TABLE 1

| Round r, Step p | Byte 0, A0 | Byte 1, A1 | ... | Byte 6, A6 | Byte 7, A7 | ... |
|---|---|---|---|---|---|---|
| Round 1, SBOX in | $R_0 \oplus R_1 \oplus R_2 \oplus R_3 \oplus R_4$ | $R_0 \oplus R_1 \oplus R_2 \oplus R_3 \oplus R_5$ | ... | $R_0 \oplus R_1 \oplus R_2 \oplus R_3 \oplus R_{10}$ | $R_0 \oplus R_1 \oplus R_2 \oplus R_4 \oplus R_5$ | ... |
| Round 1, SBOX out | $R_0 \oplus R_1 \oplus R_2 \oplus R_5 \oplus R_9$ | $R_0 \oplus R_1 \oplus R_2 \oplus R_5 \oplus R_{10}$ | ... ... | ... | ... | ... |
| ... | ... | ... | ... | ... ... | ... | ... |

It is necessary to choose t combinations from among all the NK possible combinations defined by the binomial coefficient $$\binom{n}{k}$$

and then associate each combination to each of the t sensitive values to be protected. For the second-order protection desired, these combinations may be chosen freely in step 120.

The first condition of protection evaluated in step 102, and in general the method 100 described with reference to FIG. 2, provide a first degree of protection that is fully effective up to the protection level d=2.

It has moreover been found that, for desired protection levels d greater than 2, the protection also depends upon a minimum number of masks not in common between a pair of values to be protected, e.g., upon the minimum distance dist between two combinations $C^k$.

To provide the desired protection, in particular for d>2, the minimum distance dist is greater than or equal to the desired protection level d minus one. Hence, in variants of the method described herein, it is envisaged that in step 120 during generation of the unique combinations $C^k$ a second condition of protection will be evaluated, e.g., whether the unique combinations $C^k$ satisfy the condition where $dist(C^k)$ is greater than or equal to the protection level d minus one, $dist(C^k) \geq d-1$. Hence, a second condition of protection that can be used by the method described herein is that the distance $dist(C^k)$ be greater than or equal to the protection level d minus one.

In the foregoing example regarding ABS encryption, by construction each pair of values in any point of the algorithm differs for at least two masks (minimum distance=2); consequently, the method provides a second-order protection from the side-channel attacks, e.g., d=2 as desired.

Once again for values of desired protection level greater than 2, e.g., d>2, a further vulnerability derives from the combinations of a number of masked values.

The method described herein, in an embodiment, comprises verifying also that, when the intermediate values originating from the intermediate steps are combined together for requirements of the calculation envisaged by the encryption procedure, the result will still be protected, e.g., that, as a result of the operations of calculation, the masks will not be removed.

Provided hereinafter, to enable a better understanding, is an example of the problem that an embodiment facilitates addressing. For example, if to three values, A, B, C that are the three inputs of an XOR operation in a given step of an encryption procedure, the following masks are applied on the basis of the mask values $M_0$, $M_1$, $M_2$:

$A \oplus M_0 \oplus M_1$ $B \oplus M_0 \oplus M_2$ $C \oplus M_1 \oplus M_2$ the result of the XOR operation will not be protected by any mask:

$(A \oplus M_0 \oplus M_1) \oplus (B \oplus M_0 \oplus M_2) \oplus (C \oplus M_1 \oplus M_2) = A \oplus B \oplus C$ Hence, a side-channel attack that were to consider (for example, through power consumption) the XOR of the above masked values, hence using in this case three leakage operations £

£$(A \oplus M_0 \oplus M_1)$

£$(B \oplus M_0 \oplus M_2)$

£$(C \oplus M_1 \oplus M_2)$ would remove the protection. It should be noted that the use of three leakage operations £ for the attack in itself determines the need for a protection level d equal to 3.

The protection depends upon the fact that the masks that identify the minimum distance, e.g., the distance $dist(C^k)$, greater than or equal to the protection level d minus one, set according to the previous criterion, in the example just shown the masks $M_1$ and $M_2$, never appear combined together to protect a third sensitive value.

In this case, it is necessary to proceed in such a way that the number of combinations between values, e.g., of leakage operations £, necessary to remove all the masks is greater than the desired protection level d.

What has been described above is obtained in general in an embodiment of the method described herein using different distinct pools, namely, distinct sets of independent elements, of random mask values for different mask positions in the combination $C^k$. Given a combination $C^k$ of k masks $M_0 \oplus M_1 \ldots \oplus M_h \ldots \oplus M_{k-1}$, h indicates the mask position.

Hence, a third condition of protection applied by the method described herein is that of using different independent pools of random mask values for different mask positions h in the combination $C^k$.

Figure 3:
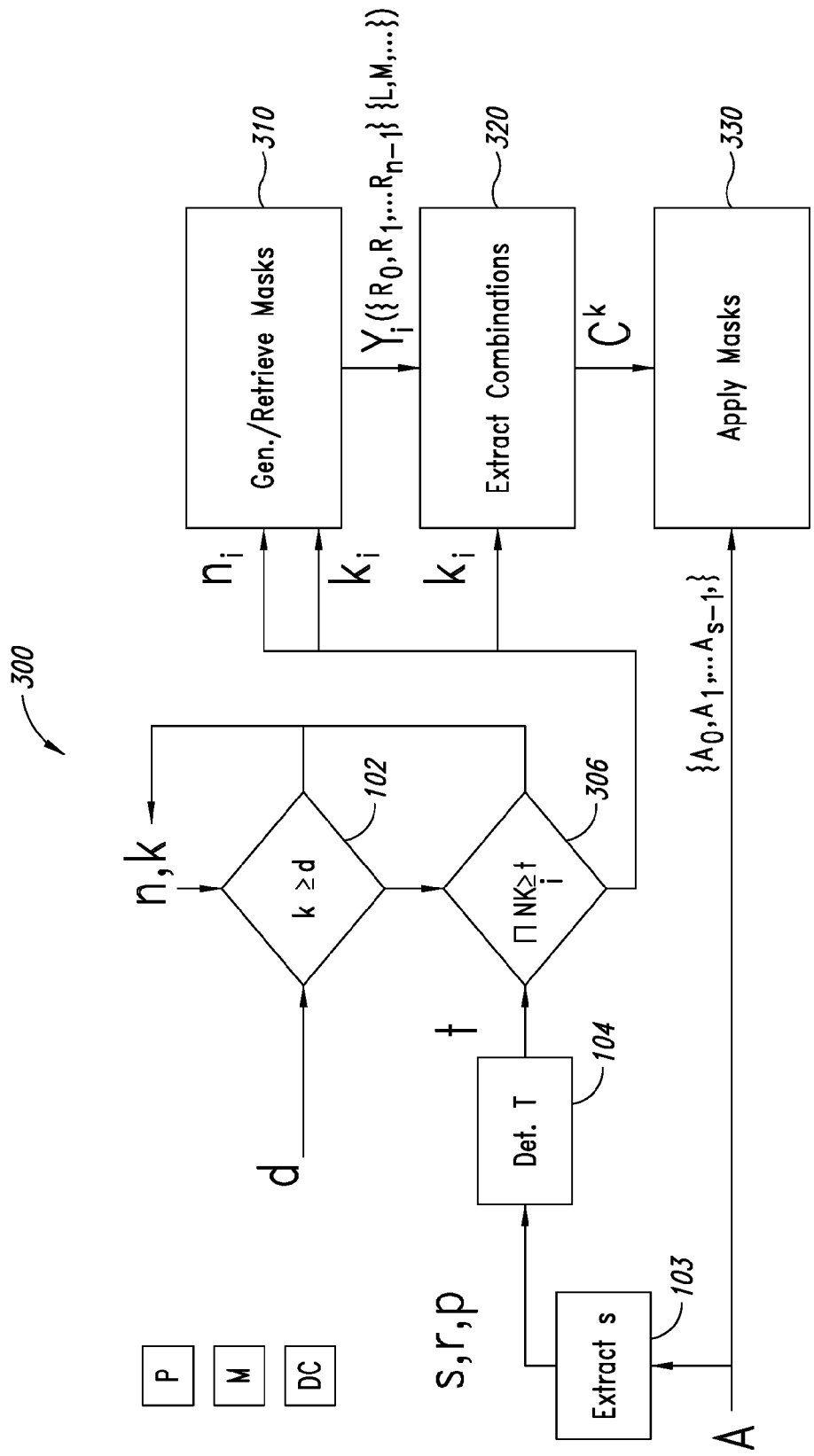
FIG. 3 shows a flowchart illustrating an embodiment of an encryption method described.

With reference to what has just been discussed, FIG. 3 shows a flowchart of a method for performing an encryption 300 that, as compared to the method 100 of FIG. 2, also envisages verifying the two further conditions of protection discussed hereinafter, namely, that the unique combinations $C^k$ generated satisfy the condition of $dist(C^k)$ being greater than or equal to the protection level d minus one, and using different independent pools of random mask values for different mask positions h in the combination $C^k$, so that the combination of intermediate values originating from the intermediate steps for the requirements of calculation gives rise to a result that is still protected, e.g., that the masks are not removed.

Figure 4:
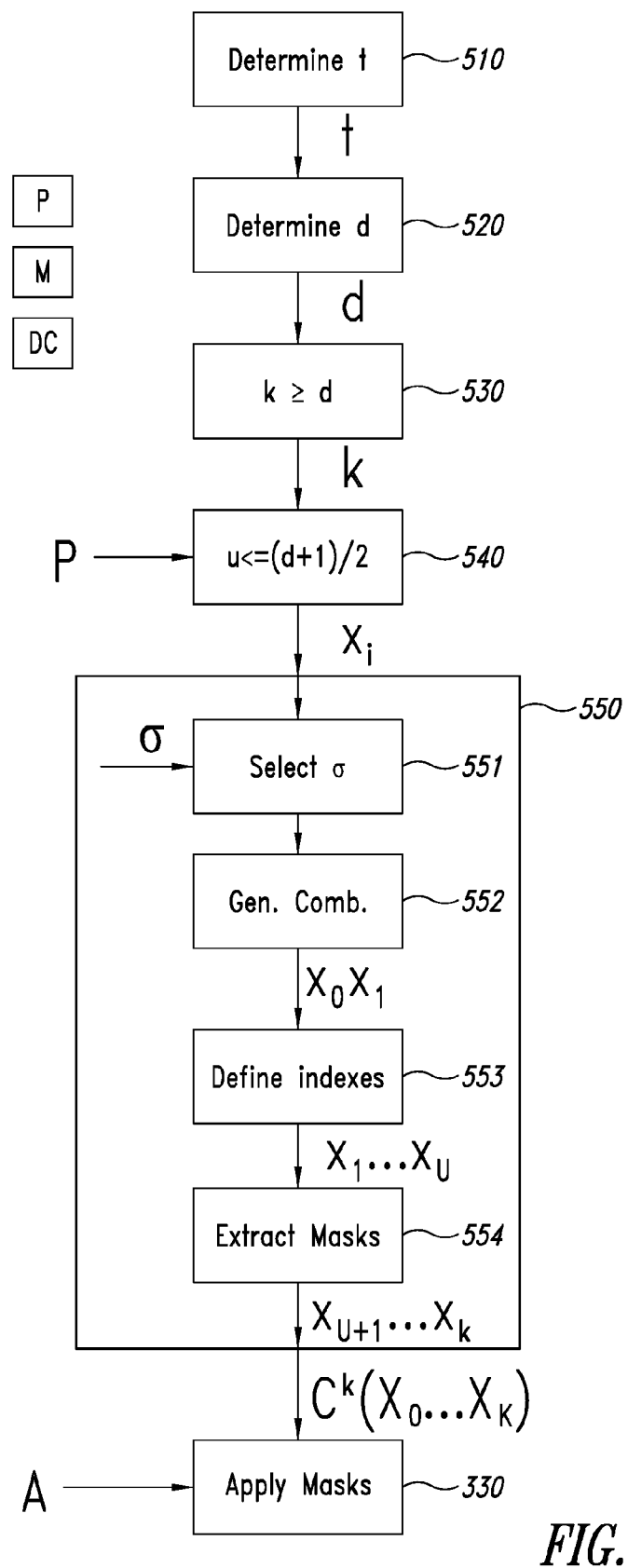
FIG. 4 shows a flowchart illustrating an embodiment of an encryption method described.

FIGS. 2-4 also illustrate processing circuitry P, memory M (e.g., one or more registers, a ROM, a RAM, etc., and various combinations thereof), and discrete circuitry DC, which may be used alone or in various combinations to implement the functionality of the method disclosed herein. For example, a cryptographic processor may be configured to implement an embodiment of a method described herein.

In the flowchart of FIG. 3 operations similar to those represented in FIG. 2 are designated by the same numbers. In particular, the method 300 comprises the same determination process as that represented through the operations 102-106.

However, the step 110 of generating and/or making available a set of random mask values $\{R_0, R_1, \ldots, R_{n-1}\}$ is, in this case, a step 310 of generating and/or making available a plurality of distinct sets of random values Y where the number of these sets may correspond, for example, to the class k of the unique combinations $C^k$. As exemplified hereinafter, in the case where d=2 to which the flowchart of FIG. 3 refers, it is possible to choose as two distinct sets of random values, $Y_0$ and $Y_1$, the values of the masks of the intermediate steps $\{L, M, \ldots\}$ and the random mask values $\{R_0, R_1, \ldots, R_{n-1}\}$ corresponding to the byte indices of the ABS state. According to a different, more general, embodiment, illustrated for example with reference to FIG. 4, the step 310 of generating and/or making available a plurality of distinct sets $Y_i$ of random values envisages making partitions $X_i$ in a pool P of random values such that these partitions $X_i$ will correspond to distinct sets of random values $Y_i$.

With reference to FIG. 3, it is possible to consider in particular different values of n and k for the different distinct sets $Y_i$. In the specific case of two distinct sets $Y_i$ discussed herein, there are obtained numbers of values in the distinct sets that are equal, respectively, to $n_0$ and $n_1$ (hence, for example, the number of values of the masks of the intermediate steps $\{L, M, \ldots\}$ is $n_0$, whereas the number of values of the masks for the bytes of the state $\{R_0, R_1, \ldots, R_{n_1-1}\}$ is $n_1$) and classes $k_0$, $k_1$. The following properties apply:

the binomial coefficients are calculated separately ($n_0$ on $k_0$) and ($n_1$ on $k_1$), to obtain two different numbers NK0 and NK1 of unique combinations;

the number of unique combinations NK necessary to satisfy the second condition at step 106 is given by the product of the two numbers of unique combinations for the two distinct sets $Y_i$: NK0·NK1=NK, NK0·NK1≥t; in the specific case of AES, NK0=20, NK1=16 (since $k_0=1$ and $k_1=1$, hence NK0=$n_0$ and NK1=$n_1$ and hence 16·20=320=t; and for the protection, the numbers of values $k_0$ and $k_1$ extracted at the same time from the distinct sets $Y_0$ and $Y_1$ are summed up to evaluate the first condition of protection at step 102, e.g., $k_0+k_1$=k≥d.

Hence, in particular, for application of the third condition of protection, the associated condition on the number n of random values becomes in general that the product H of the number of unique combinations determined by each of the distinct sets is greater than the number t of sensitive values to be protected. In FIG. 3, step 106 is replaced by a step 306 of verification of the above condition on the number n, namely, $\Pi NK_i$≥t.

The aforesaid plurality of distinct sets $Y_i$ of random values is thus supplied to a step 320 of extraction of a plurality of sets of masks to generate a plurality of unique combinations $C^k$.

In step 320 it is envisaged for example to:

a) use different sets $Y_i$ of random values for filling different mask positions h in the combination $C^k$; and b) verify whether these unique combinations $C^k$ satisfy the condition of dist($C^k$) being greater than or equal to the protection level d minus one.

The operation a) in FIG. 3 may be understood to use the different sets $Y_i$ of random mask values to fill different mask positions h in the combination $C^k$ so as to obtain by construction masks that prevent their removal in the intermediate steps.

For example, once again in the ABS case with second-order protection with two masks it is possible, in order to carry out step 320, to use two different sets $Y_0$, $Y_1$ of random mask values to fill two different mask positions h in the combination $C^k$, which correspond to the values of the masks of the intermediate steps {L, M, . . . } and to the sets of random mask values {$R_0$, $R_1$, . . . , $R_{n-1}$} corresponding to the byte indices of the ABS state, carrying out, that is, composition of two values for is mask that is applied to the ABS state, namely:

a first value that depends upon the intermediate step, L, M, N, . . . ; each value is of 1 byte; in the case of 2 steps per round and 10 rounds, 20 bytes are used; and a second value that depends upon the byte index of the state, $R_0$, . . . , $R_{15}$; In this way, there are 16 values to be used for masking the 16 bytes of the state A; the same mask value $R_1$ is used for each byte with the same index 1 in each round.

It is emphasized how the first and second mask values, with position index h=0 and h=1, respectively, are thus extracted from two distinct sets of random values.

This is exemplified in Table 2 below, where the rows indicate the round r and the step p, e.g., the step of the round, for example for Round 1, SBOX in, the first column indicates the mask of the intermediate step, L, M, N, . . . , taken from the first distinct set, and the remaining columns indicate the state bytes, Byte0, Byte1, Byte15. The contents of each cell indicate the combination of two masks used for protecting the corresponding intermediate sensitive value for a given byte Byte0, Byte1, . . . , Byte15:

TABLE 2

| Round r, Step p | Mask, step | Byte0 | Byte1 | . . . | Byte15 |
|---|---|---|---|---|---|
| Round 1, SBOX in | L | L ⊕ $R_0$ | L ⊕ $R_1$ | | L ⊕ $R_{15}$ |
| Round 1, SBOX out | M | M ⊕ $R_0$ | M ⊕ $R_1$ | | M ⊕ $R_{15}$ |
| Round 2, SBOX in | N | N ⊕ $R_0$ | N ⊕ $R_1$ | | N ⊕ $R_{15}$ |
| Round 2, SBOX out | O | O ⊕ $R_0$ | O ⊕ $R_1$ | | O ⊕ $R_{15}$ |
| . . . | | | | | |
| Round 10, SBOX in | W | W ⊕ $R_0$ | W ⊕ $R_1$ | | W ⊕ $R_{15}$ |
| Round 10, SBOX out | Z | Z ⊕ $R_0$ | Z ⊕ $R_1$ | | Z ⊕ $R_{15}$ |

W, Z are further masks in the pool of the masks L, M, N, . . . associated to the final round.

The embodiment exemplified in Table 2 is effective in so far as the values are in this way protected at least by the minimum number of masks, e.g., k=2 for protection level d=2, thus respecting the first condition 102. In fact, all the values calculated in the intermediate steps are associated to different combinations. The masks $R_1$ of the second set of values independent of one another guarantee second-order protection within one and the same round. A different mask of the first set of values L, M, N for each round r and step p provides that there is no second-order vulnerability between one step and the other employing values that use the same mask $R_1$ of the second set of values. The solution presented also ensures that the masks will be preserved and remain effective for a second-order protection even for all the intermediate values of the linear operations ShiftRows+ MixColumns+AddKey.

The above embodiment moreover adopts a number of random values in each of the two distinct sets that is low.

There is a minimum number of intermediate values to be calculated on the masks in order to preserve the results at the end. For example, use of a mask for all the bytes of the ABS state at the input of the linear part causes also the state at the end of the linear part to be masked exactly by the same mask, without any need of deriving therefrom the final mask value. The reason for this is that when the linear part of ABS is applied to 16 identical bytes, the result is still made up of the same 16 identical bytes.

It should be noted that in the method described herein the size of the masks for a Boolean masking may be chosen so as to have for all the masks the same size in bits as the sensitive-data values to be protected.

In the case where the intermediate values have the same size (8 bits in the ABS case), all the random values have the same size.

In the case where the intermediate values have a different size (as in the DES case described hereinafter) each random value has the same size of the largest sensitive value that it protects. For the smaller sensitive values, the bits over of the mask may simply be discarded. For example, in the case of the DES (Data Encryption Standard) SBOX the input in the SBOX is a 6-bit input, and the output is a 4-bit output. The mask L of the first round at input is hence of 6 bits, since it protects 6-bit input values, whereas the mask M of the first round at output is of 4 bits, since it protects 4-bit output values. The masks $R_0$, $R_1$, . . . of the first set of masks have a size of 6 bits because they protect 4-bit and 6-bit values. As has been said, these 6-bit masks of the first set, $R_0$, $R_1$, . . . can be replaced by their 4-bit subsets, $R'_0$, R'$_1$, ..., discarding two bits. Table 3 below exemplifies this protection for the case of the DES SBOX.

TABLE 3

| Round, Step | Mask, step | Byte0 | Byte1 | ... |
|---|---|---|---|---|
| Round 1, SBOX in | L | L ⊕ R$_0$ | L ⊕ R$_1$ | ... |
| Round 1, SBOX out | M | M ⊕ R$_{0'}$ | M ⊕ R$_{1'}$ | ... |
| ... | ... | ... | ... | ... |

Alternatively, step 320 of extraction can be carried out, given a certain protection level d to be guaranteed, by selecting at this step a combination, in particular via distinct sets Y$_i$ if the protection level d is greater than 2, and then making an analysis of the vulnerabilities in the intermediate steps.

Hence, as regards selection of the combinations C$^k$ within one and the same protection level d there are different possible solutions, according to the trade-off between the number of random values, latency of the protection scheme, simplicity of implementation, and simplicity of analysis of the vulnerabilities. For the class k the value chosen at step 102 may take into account more than the protection level d and the latency in execution of the protection scheme.

As has been discussed, to obtain a second-order protection it is possible to use a set Y of random mask values imposing the first condition 102 on the class k and choosing the number n of values of the set Y so as to determine a number of combinations that is greater than or equal to the number of values t to be protected, whereas to obtain upper-order protection may have moreover:
- a minimum distance dist between the combinations C$^k$ (second protection condition); and
- distinct sets Y$_i$ of random numbers for different mask positions h (third protection condition).

In this contingency (d>2), the product of the coefficients of the binomial on the number n$_i$ and class k$_i$ for each distinct set Y$_i$ is greater than or equal to the number t of sensitive values to be protected.

Starting from this, to provide a given protection level on the basis of the first, second, and third protection conditions, in particular because the protection level d is higher than 2, it is possible to proceed either in an exhaustive way or by construction, namely:
- a set of combinations is selected and an exhaustive analysis of the vulnerabilities is carried out;
- or else combinations are generated that satisfy by construction the required protection scheme, e.g., the three conditions indicated above.

There now follows a description of an embodiment of the method for performing an encryption that takes into account all three protection criteria (k>d, dist(C$^k$)>d+1, distinct sets of masks) with a more general field of application, in particular not depending upon the specific use of an AES or DES encryption, by constructing sets of random masks that in particular satisfy the second and third protection criteria to be applied in step 320, which is applicable also to cases where the state A is not the AES state and the desired protection level d is higher than 2.

Hence, given a pool of random variables P, denoted by u in what follows is a number of partitions X$_i$ of the pool of random variables P. X$_i$ is the set of values of the i-th partition, n$_i$ is the number of random values contained in the i-th partition X$_i$, e.g., its size, k$_i$ is the number of values extracted at the same moment from the i-th partition X$_i$, while x$_i$ is the mask position h corresponding to the i-th partition X$_i$, and x$_i^j$ is the j-th value of the i-th partition, e.g., the effective value of the mask x$_i$. Finally t is the number of sensitive variables to be protected.

In this framework, as regards the number of distinct sets Y$_i$ to be chosen according to the protection level, it is envisaged to divide the pool of random values P into partitions X$_i$, where each element of the pool P belongs to one and only one partition X$_i$. The number u of partitions X$_i$ corresponds to the distinct sets Y$_i$.

Moreover, it is envisaged to choose the number u of partitions X$_i$ to be used according to the following criterion:
a) for the cases with desired protection level d equal to 2 a single partition of random values is sufficient (as in Table 1 or in the method 100 of FIG. 2), apart from the requirements deriving from the other conditions of protection; in fact, as seen previously, a single partition of random values provides a protection for a desired protection level d lower than 3;
b) for a desired protection level d>2, a number u of partitions is used other than one; u partitions guarantee protection up to a protection level d lower than 2u, d<2u; hence, 2 partitions protect up to d<4, and 3 partitions up to d<6, as exemplified hereinafter in the example regarding a protection level d=5; it is here specified that u represents the number of non-trivial partitions X$_i$, e.g., ones comprising more than a single element.

In what follows, it is assumed for simplicity that for the first two partitions the number of values extracted at the same moment is k$_0$=k$_1$=1; e.g., for each of the partitions a single mask is extracted. The case may be extended to k$_i$>1 where a value is replaced by a unique combination of extracted values.

Likewise, imposing that the partitions X$_0$, X$_1$ have the same size enables easier construction. A variant embodiment with partitions of different size n$_i$ is discussed hereinafter.

The number of masks k is defined by the other constraints. u partitions means u masks, with k$_i$=1. For the first criterion of protection, k is greater than or equal to d. If u<d, the d−u missing masks can be extracted from dedicated trivial partitions (ones containing a single element).

The minimum number u of the partitions for any value of protection level d is hence $$u = \text{floor}((d+1)/2)$$

where u masks are extracted from the u partitions. The function floor(x), as is known, calculates the integer part of the argument, e.g., the largest integer smaller than or equal to x.

A total of d masks is required; hence, d−u masks are extracted from other partitions (also trivial partitions with a single value, as mentioned).

In what follows, before indicating a general criterion of construction, specific examples are illustrated to explain the meaning of certain operations.

There hence follows an example, with reference to Table 4 below, of construction of combinations of masks satisfying the first, second, and third conditions of protection for a protection level d=5.

For the first condition of protection, the class k of the aforesaid plurality of combinations C$^k$ is greater than or equal to a protection level d, e.g., the class k is at least 5. According to what has been said previously, d=5 implies a number u of partitions X$_i$ at least equal to 3: u=(d+1)/2.

Hence, three partitions X$_0$, X$_1$, X$_2$ are assumed for the masks x$_0$, x$_1$, x$_2$, whereas for the masks x$_3$, x$_4$ it is possible to use any value of the pool not belonging to the three partitions X$_0$, X$_1$, X$_2$, even two single values from two trivial partitions. As has been said, in this case $n_0=n_1=n_2$; e.g., the partitions $X_0$, $X_1$, $X_2$ have the same size. As has been said previously, the condition $n_0 \cdot n_1 \geq t$ is satisfied.

The values in each partition $X_i$ are ordered according to an index j, even though of course, since they are random values, they are not in general ordered in the partitions.

Each sensitive value is associated to a specific combination of values $x_0$, $x_1$. Also the order of the combinations is not in general significant, but in the example described here, to understand better the general example, the order in the table below is adopted, where $x_i^j$ is the j-th value of the i-th partition associated to a given sensitive value. The rows of Table 4 below each correspond to a different generic sensitive value. Appearing in the columns of Table 4 is the partition $X_i$ from which the value $x_i^j$ is extracted.

TABLE 4

| Partition $X_0$ | Partition $X_1$ | Partition $X_2$ |
|---|---|---|
| $x_0^0$ | $x_1^0$ | $x_2^0$ |
| $x_0^0$ | $x_1^1$ | $x_2^1$ |
| $x_0^0$ | $x_1^2$ | $x_2^2$ |
| $x_0^0$ | $x_1^3$ | $x_2^3$ |
| $x_0^0$ | ... | ... |
| $x_0^0$ | $x_1^{n_1-1}$ | $x_2^{n_2-1}$ |
| $x_0^1$ | $x_1^0$ | $x_2^1$ |
| $x_0^1$ | $x_1^1$ | $x_2^2$ |
| $x_0^1$ | $x_1^2$ | $x_2^3$ |
| $x_0^1$ | $x_1^3$ | $x_2^4$ |
| ... | ... | ... |
| $x_0^1$ | $x_1^{n_1-2}$ | $x_2^{n_2-1}$ |
| $x_0^1$ | $x_1^{n_1-1}$ | $x_2^0$ |
| ... | ... | ... |
| $x_0^{n_0-1}$ | $x_1^{n_1-1}$ | ... |

As may be noted, the value $x_2$ of the third partition $X_2$ is chosen as a permutation σ of the value $x_1$ in the second partition $X_1$. The reason for this is to implement the criterion whereby, except for the rows where the index j of the value $x_0$ of the first partition is zero, e.g., it is the first value taken from the first partition, there are not be rows in which the index j of $x_1$ is equal to that of $x_2$.

This occurs, for example, if the permutation σ is a simple rotation to the left by 1:

$$\sigma = \begin{pmatrix} 0 & 1 & 2 & \dots & n_1-2 & n_1-1 \\ 1 & 2 & 3 & \dots & n_1-1 & 0 \end{pmatrix}$$

The permutation may equivalently be a rotation to the right.

The permutation σ is applied a number of times equal to the number of values of the first partition $X_0$. The index of the first mask $x_0$, j=0, defines the starting point of the cycle.

With reference to Table 5 below, there now follows instead an example of construction of combinations of masks satisfying the first, second, and third condition of protection for the protection level d=7.

According to what has been mentioned previously for d=7 it is necessary to have a number u of independent partitions equal to 4 or more. Hence, from four partitions $X_0$, $X_1$, $X_2$, $X_3$ for example four respective values $x_0$, $x_1$, $x_2$, $x_3$ are extracted. Since k is to be greater than or equal to the protection level d, 7 masks are, however, necessary in all. The masks $x_4$, $x_5$, $x_6$ may be chosen of any value in the pool P that does not belong to the four partitions $X_0$, $X_1$, $X_2$, $X_3$.

Maintaining for simplicity the same size for the partitions, e.g., $n_0=n_1=n_2=n_3$ equal to a prime number, $n_0 \, n_1$ is greater than or equal to t.

The value of $x_2$ is chosen in such a way that its index is a permutation of the index value used for selecting the mask $x_1$, as has been seen previously for d=5. A cycle of length $n_2$, or $n_2$-cycle, where $n_2$ is the size of the second partition, of permutations enables generation of $n_2$ cyclic permutations, changing only the starting point from which fetching of values in a partition is started. Each of the $n_2$ permutations is associated to the index j of the first mask $x_0$; e.g., the permutation is applied a number of times equal to the number of values of the first partition of the first mask $x_0$. The index of the first mask $x_0$, j=0, defines the starting point of the cycle.

The value of $x_3$ is chosen in such a way that its index is a different permutation of the index used for selecting the mask $x_2$. The new permutation changes all the positions. As has been said previously, except for the rows where the index j of the value of the first mask $x_0$ of the first partition $X_0$ is zero, e.g., is the first value taken from the first partition, there are not any rows where the index j of $x_2$ is equal to that of $x_3$.

If σ is the first permutation applied to the partition $X_2$ and T the second permutation applied to the partition $X_3$, it is possible to impose that the second permutation τ is equal to $\sigma^2$, e.g., to the permutation σ applied twice to the index j (both of the permutations are referred to the order of the elements in $X_1$).

This leads to a table such as Table 5 below, similar to the previous one but comprising an additional column for the further partition $X_3$:

TABLE 5

| Partition $X_0$ | Partition $X_1$ | Partition $X_2$ | Partition $X_3$ |
|---|---|---|---|
| $x_0^0$ | $x_1^0$ | $x_2^0$ | $x_3^0$ |
| $x_0^0$ | $x_1^1$ | $x_2^1$ | $x_3^1$ |
| $x_0^0$ | $x_1^2$ | $x_2^2$ | $x_3^2$ |
| $x_0^0$ | $x_1^3$ | $x_2^3$ | $x_3^3$ |
| $x_0^0$ | ... | ... | ... |
| $x_0^0$ | $x_1^{n_1-1}$ | $x_2^{n_2-1}$ | $x_2^{n_3-1}$ |
| $x_0^1$ | $x_1^0$ | $x_2^1$ | $x_3^2$ |
| $x_0^1$ | $x_1^1$ | $x_2^2$ | |
| $x_0^1$ | $x_1^2$ | $x_2^3$ | |
| $x_0^1$ | $x_1^3$ | $x_2^4$ | |
| ... | ... | ... | ... |
| $x_0^1$ | $x_1^{n_1-2}$ | $x_2^{n_2-1}$ | |
| $x_0^1$ | $x_1^{n_1-1}$ | $x_2^0$ | |
| ... | ... | ... | ... |
| $x_0^{n_0-1}$ | $x_1^{n_1-1}$ | ... | ... |

Even though in the previous examples the sizes $n_0$ and $n_1$ of the first two partitions have been represented as being the same, they may have any value. The product $n_0 \, n_1$ is greater than or equal to the number t of sensitive variables to be protected.

In practice, the sizes $n_0$ and $n_1$ are chosen with the purpose of enabling easy mapping with respect to the structure of the algorithm, as in the case of the AES described previously. In general, the choice $n_0=n_1=n_u$ is the most efficient one.

As regards the sizes of the other partitions, $n_2 = \ldots = n_u$. These sizes are equal to a prime number $n_u$ such that $n_u$ is greater than or equal to the maximum between $n_0$ and $n_1$, $\max(n_0, n_1)$.

Table 6 below represents a construction via permutations starting from an base n-cyclic permutation σ that can be used in general according to an embodiment of the present method, for example for d>2.

TABLE 6

| Partition 0, $X_0$ | Partition 1, $X_1$ | Partition 2, $X_2$ | Partition 3, $X_3$ | Partition 4, $X_4$ |
|---|---|---|---|---|
| $x_0^0$ | I | I | I | I |
| $x_0^1$ | I | $\sigma$ | $\tau$ | $v$ |
| $x_0^2$ | I | $\sigma 2$ | $\tau 2$ | $v2$ |
| $x_0^3$ | I | $\sigma 3$ | $\tau 3$ | $v3$ |
| $x_0^4$ | I | $\sigma 4$ | $\tau 4$ | $v4$ |
| $x_0^5$ | I | $\sigma 5$ | $\tau 5$ | $v5$ |
| ... | ... | ... | ... | ... | where $\sigma, \sigma^2, \sigma^3, \ldots$ are generated through a cycle of length $n_u$.

We have: $\tau = \sigma^2$; $v = \sigma^3$.

On the basis of what has just been said, a method for performing an encryption in a variant that can be applied to values of level d>2 may in general, with reference to the flowchart of FIG. 4, comprise the following steps:

in a step 510 identifying the number t of variables to be protected in the encryption procedure; this step 510 can be implemented via the steps 103 and 104 of FIG. 2 or FIG. 3; in this step 510 it may be convenient to divide the variables according to two directions, for example, as in the case of the AES, number of steps or rounds $n_0$ and number of bytes per step $n_1$ such that $n_0 \cdot n_1 = t$;

in a step 520 selecting the desired protection level d;

in a step 530 (corresponding to the step 102 of evaluation of the first condition of protection) selecting the number k of masks per value such that $k \geq d$;

in a step 540, dividing a pool P of random values into a number u of partitions such that $u \geq (d+1)/2$; in an embodiment, the partition $X_0$ has $n_0$ elements, the partition $X_1$ has $n_1$ elements, the partitions $X_2, \ldots, X_u$ have $n_u$ elements where $n_u \geq \max(n_0, n_1)$, and $n_u$ is a prime number; the partitions u+1, ..., k, in the case where these exist, have one element; e.g., they are trivial partitions; this step 540 corresponds to an embodiment of the step 310 of FIG. 3;

in a step 550 the t unique combinations of k masks are generated so that for each combination of $x_{i1}^{j1}, x_{i2}^{j2}$, the values j1 and j2 of the index j are never present together twice; i1 and i2 are values of the index i, which indicates two different partitions of the partitions $X_i$; this means, for example, that, when the partition $X_2$ is defined for the position value h=2, it never happens that the same pair $x_1^{j1}, x_2^{j2}$ is selected for two different values of the partition $X_0$; this means, for example, that, when the partition $X_3$ is defined for the position value h=3, it never happens that the same pair $x_1^{j1}, x_3^{j2}$ is selected for two different values of the partition $X_0$, but nor does it ever happen that two pairs $x_1^{j1}, x_2^{j2}$ and $x_1^{j1}, x_3^{j2}$ are present together for two different values of the partition $X_0$; the same procedure is thus followed for all the other masks; more in general, step 550 may also be formulated as generating a number of unique combinations $C^k$ such that for all the combinations $C^k$ of masks having in common one and the same mask value $x_0^j$ of a first partition $X_0$ from among those partitions, except for the first mask value $x_0^0$ of the first partition $X_0$, taking in pairs, from different partitions, the remaining mask values corresponding to the remaining partitions, for example $X_1, X_2, X_3, X_4$, in each of these pairs the two values will have a position index j in the respective partition that is different; as has been mentioned, combinations that meet the conditions referred to may be obtained, for example, in one of the following two ways:

(i) by selecting in a random way the combinations and checking a posteriori in an exhaustive way that the conditions are always satisfied; or else (ii) by following a rule that guarantees a priori by construction that the conditions indicated above are always satisfied; an example of this second way, with a priori rule, which can be implemented in step 550 envisages the following substeps:

a step 551 of selecting a base cyclic permutation $\sigma$ with cycle length $n_u$, for example rotation to the left by one position;

a step 552 where generation of all the combinations of the partitions $X_0$ and $X_1$ starts;

a step 553 where the index of the element extracted from each partition $X_h$, where h is mask-position index, for 1<h<u is defined via a permutation on the second partition $X_1$, which is generated starting from the cyclic permutation $\sigma$ and depends upon the first mask value $x_0$; for example, if j1 is the index of the element $x_0$ and j2 the mask index corresponding to the partition $X_h - 1$ (e.g., j2=h-1), then the permutation to be applied to the order of the elements in $X_1$ to obtain the order of the elements in $X_h$ corresponding to the same value of $x_0$ is $\sigma^{(j1 \cdot j2) \bmod n_u}(X_1)$, where $\sigma^0$ corresponds to the identity permutation I; hence, the indices for the u-1 partitions $X_1, \ldots, X_u$ are thus generated; for example, the order of the elements of $X_2$ (hence h=2, j2=1) is $\sigma^0(X_1)$ (e.g., the same as that of $X_1$) for the rows with $x_0^0$ (since j1=0), $\sigma^1(X_1)$ for the rows with $x_0^1$ (since j1=1), $\sigma^2(X_1)$ for the rows with $x_0^2$ (since j1=2), and so forth; instead, the order of the elements of $X_3$ (hence h=3, j2=2) is $\sigma^0(X_1)$ (e.g., the same as that of $X_1$) for the rows with $x_0^0$, $\sigma^2(X_1)$ for the rows with $x_0^1$, $\sigma^4(X_1)$ for the rows with $x_0^2$, and so forth; for example, assuming that $n_u=23$ (as in the ensuing ABS example), if we were to calculate the index of the elements of $X_4$ (hence j2=3) when $x_0=14$ (j1=14), we should use the permutation $\sigma^{(3 \cdot 14) \bmod 23} = \sigma^{19}$; and a step 554 where all the other masks $X_{u+i}, \ldots$ are extracted from trivial partitions with one element.

Step 540 corresponds to an embodiment of step 310 of FIG. 3.

Hence, in a step 560, corresponding to step 330, a different unique combination $C^k$ obtained via step 550 is applied as mask to each respective sensitive-data values $\{A_0, A_1, \ldots, A_{s-1}\}_{r,p}$, to be protected for each stage, e.g., for each round r and each step p of the encryption procedure 200.

Hence, according to the embodiment provided by way of example of FIG. 4, in various embodiments the operation 550 of generating a number of unique combinations $C^k$ may more in general comprise: selecting a base cyclic permutation $\sigma$ with a given cycle length $n_u$ that is a prime number at least equal to the maximum $\max(n_0, n_1)$ between the size $n_0$ of the first partition and the size $n_1$ of the second partition; generating all the combinations of the values $x_0 x_1$ of the first partition $X_0$ and of the second partition $X_1$; defining each further partition $X_h$ with index h up to the number u of distinct and independent partitions $(X_i)$ via a permutation (for example I or $\sigma^0$, $\sigma$; $\tau$ or $v$) applied on the second partition $X_1$ generated starting from the cyclic permutation $\sigma$ and depending upon the index j of the first mask value $x_0$; and extracting possible further masks $X_{u+1}, \ldots$ from one-element partitions.

An example of implementation according to the embodiment of FIG. 4 is now described. The example below applies to the ABS case with protection level d=5.

As has already been said for the protection level d, the number t of sensitive variables to be protected is 320; hence, a number of unique combinations of masks is required greater than or equal to 320, with a number k of masks for each sensitive value greater than or equal to 5.

On the basis of what has been mentioned above, the number u of non-trivial partitions of the random pool P is greater than or equal to 3.

It is possible to adopt as starting point the previous example for protection of the ABS against second-order attacks (d=2).

Denoted by $x_0$ is the mask extracted from the partition $X_0$, $\{x_0^0, x_0^1, x_0^2, \ldots, x_0^{n_0-1}\}$, where $n_0$ is equal to 20. In this way, this partition $X_0$ may be, for example, the set $\{L, M, N, \ldots\}$ of intermediate masks with 20 elements.

Denoted by $x_1$ is the mask extracted from the partition $X_1$, $\{x_1^0, x_1^1, x_1^2, \ldots, x_1^{n_1-1}\}$, where $n_1$ is equal to 16. In this way, this partition $X_1$ may, for example, be the set $\{R_0, R_1, \ldots, R_{15}\}$ corresponding, according to the index, to the bytes of the ABS state A, hence with 16 elements.

Denoted by $x_2$ is the mask extracted from the partition $X_2$, $\{x_2^0, x_2^1, x_2^2, \ldots, x_2^{n_2-1}\}$, where $n_2$ is equal to 23. The number $n_2$ is the smallest prime number greater than or equal to $\max(n_0, n_1)$. It corresponds to $n_1$, in the general formulation.

Denoted by $x_3$ is the mask extracted from the partition $X_3$, $\{x_3^0\}$.

Denoted by $x_4$ is the mask extracted from the partition $X_4$, $\{x_4^0\}$.

Hence, there are three non-trivial partitions, $X_0$, $X_1$, $X_2$, having respective sizes $n_0=20$, $n_1=16$, $n_2=23$, and two trivial one-element partitions with size $n_3=n_4=1$.

A mask is extracted from each partition, e.g., $k_0=k_1=k_2=k_3=k_4=1$. The class k is equal to the sum of the classes $k_i$, e.g., in this case equal to 5.

The indices of the masks $x_2$ are defined via the base permutation σ "rotation to the left by one position" (which represents an $n_u$-cyclic, e.g., 23-cyclic, permutation).

For the first mask value $x_0^0$ of the first partition $X_0$, $X_2=X_1$, the index j2 of $x_2^{j2}$ is hence equal to the index j1 of $x_1^{j1}$.

For the second mask value $x_0^1$ of the first partition $X_0$, $X_2=\sigma(X_1)$, the index j2 is hence equal to (j1+1)mod 23.

For the j-th mask value $x_0^j$ of the first partition $X_0$, $X_2=\sigma^j(X_1)$, the index j2 is hence equal to (j1+j)mod 23.

This configuration generates $n_0 \cdot n_1 = 320$ unique combinations.

Operating as mentioned, 20+16+23+1+1=61 bytes of random values are necessary to provide a fifth-order protection. Without the method described herein, 320·5=1600 bytes would be necessary.

Table 7 below shows the combinations of masks for each step of the ABS.

With the method described herein, 5 masks per value (of 1 byte each) are used:
one mask based upon the intermediate calculation steps $\{L, M, N, \ldots\}$, which are in general 20, for example, the mask L;
one mask based upon the index bytes of the ABS state R, e.g., on the set $\{R_0, R_1, \ldots, R_{15}\}$, and
three masks selected from a combination for the fifth-order protection.

TABLE 7

| Round r, Step p, byte | $X_0$ | $X_1$ | $X_2$ | $X_3$ | $X_4$ |
|---|---|---|---|---|---|
| Round 1, SBOX in, byte 0 | $x_0^0$ | $x_1^0$ | $x_2^0$ | $x_3^0$ | $x_4^0$ |
| Round 1, SBOX in, byte 1 | $x_0^0$ | $x_1^1$ | $x_2^1$ | | $x_4^0$ |
| Round 1, SBOX in, byte 2 | $x_0^0$ | $x_1^2$ | $x_2^2$ | $x_3^0$ | $x_4^0$ |
| ... | | | | | |
| Round 1, SBOX in, byte 15 | $x_0^0$ | $x_1^{15}$ | $x_2^{15}$ | $x_3^0$ | $x_4^0$ |
| Round 1, SBOX out, byte 0 | $x_0^1$ | $x_1^0$ | $x_2^1$ | $x_3^0$ | $x_4^0$ |
| Round 1, SBOX out, byte 1 | $x_0^1$ | $x_1^1$ | $x_2^2$ | | $x_4^0$ |
| Round 1, SBOX out, byte 2 | $x_0^1$ | $x_1^2$ | $x_2^3$ | $x_3^0$ | $x_4^0$ |
| ... | | | | | |
| Round 1, SBOX out, byte 15 | $x_0^1$ | $x_1^{15}$ | $x_2^{16}$ | $x_3^0$ | $x_4^0$ |
| ... | | | | | |
| Round 10, SBOX out, byte 0 | $x_0^{19}$ | $x_1^0$ | $x_2^{19}$ | $x_3^0$ | $x_4^0$ |
| ... | | | | | |
| Round 10, SBOX out, byte 15 | $x_0^{19}$ | $x_1^{15}$ | $x_2^{11}$ | $x_3^0$ | $x_4^0$ |

Hence, from the foregoing description potential advantages of the solution described emerge clearly.

The encryption method described advantageously facilitates reducing the number of independent masks to be generated randomly.

The encryption method described facilitates reuse of masks without jeopardizing the protection level provided by the masking protection scheme.

The encryption method described may be extended to protection with higher levels of protection, maintaining a high efficiency in terms of masks.

Of course, without prejudice to the principle of the solution described herein, the details and the embodiments may vary, even considerably, with respect to what is described purely by way of example herein, without thereby departing from the sphere of the disclosure.

The method described herein applies in general to data stored in data media and in particular data stored in data media of any apparatus that envisages execution of an encryption algorithm comprising operations that include access to a look-up table, in particular an ABS encryption system, for example in set-top boxes or in smartcards. In an embodiment, an ABS encryption system may be regarded as a peripheral within a System-on-Chip, which is not used as stand-alone component, but is integrated in a chip of a smartcard or a chip of a set-top box or also a chip of other applications that require AES encryption.

The method described herein may in any case be applied also to other encryption systems with symmetric ciphers, for example the DES (Data Encryption Standard) system and its SBOX.

In general, the present apparatus comprises or is associated to data-processing means, in particular including one or more processors.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
masking, using cryptographic circuitry, sensitive data values by:
extracting, from at least one set of random mask values, a plurality of unique combinations of random mask values, wherein at least one of the random mask values of the at least one set of random mask values is included in more than one of the plurality of unique combinations of random mask values; and
masking each sensitive data value using a respective combination of the plurality of unique combinations of random mask values; and
performing a cryptographic procedure, said sensitive data values comprising state bytes for rounds of the cryptographic procedure, wherein:
each of the plurality of unique combinations has a protection-level class against side-channel attacks having a value which is greater than or equal to a value of a determined protection-level class against side-channel attacks; and
a number of the plurality of unique combinations is greater than or equal to a number of the sensitive data values, wherein a number of random mask values in the at least one set of random mask values is based on the number of the plurality of unique combinations and the value of the protection-level class of the plurality of unique combinations.

2. The method according to claim 1 wherein the at least one set of random mask values comprises a plurality of distinct sets of random mask values.

3. The method according to claim 1, comprising extracting a plurality of unique combinations having a distance from one another with a value greater than or equal to the value of the determined protection-level class minus one.

4. The method according to claim 3, comprising using distinct sets of random mask values for different mask positions in the unique combinations.

5. The method according to claim 1, comprising:
dividing a pool of random mask values into a number of distinct partitions greater than or equal to half the value of the determined protection-level class plus one; and
including mask values from first, second and third distinct partitions in the unique combinations, wherein pairs of masks values from the second partition and the third partition are not reused in the unique combinations.

6. The method according to claim 1, comprising:
dividing a pool of random mask values into a number of distinct partitions greater than or equal to half the value of the determined protection-level class plus one, wherein extracting a unique combination of random mask values comprises:
selecting a mask value from the first partition to include in the unique combination;
selecting a mask value from the second partition to include in the unique combination; and
for each non-trivial partition of the distinct partitions after the first partition and the second partition, selecting a mask value in the non-trivial partition to include in the unique combination, the mask value having a position index in the non-trivial partition based on a base cyclic permutation having a cycle length equal to a prime number greater than or equal to a maximum between a size of the first partition and a size of the second partition.

7. The method of claim 6, comprising:
selecting additional mask values to include in the unique combination from trivial partitions.

8. The method according to claim 6 wherein the base cyclic permutation is a rotation by one position.

9. The method according to claim 1, comprising:
dividing a pool of random mask values into a number of distinct partitions, wherein a product of a number of values of a first partition and a number of values of a second partition is greater than or equal to the number of the sensitive data values.

10. The method according to claim 1 wherein said cryptographic procedure is an Advanced Encryption Standard (AES) encryption procedure including at least one first set of random mask values, which corresponds to intermediate masks that may be the same for all bytes of a state and applied in the intermediate steps of the AES rounds, and at least one second set of random mask values, each value corresponding, according to an index, to the bytes of the AES state.

11. An apparatus, comprising:
one or more memories; and
cryptographic circuitry, which, in operation,
processes sensitive data values, the processing including:
extracting, from at least one set of random mask values, a plurality of unique combinations of random mask values, wherein at least one of the random mask values of the at least one set of random mask values is included in more than one of the plurality of unique combinations of random mask values; and
masking each sensitive data value using a respective combination of the plurality of unique combinations of random mask values, wherein:
each of the plurality of unique combinations has a protection-level class against side-channel attacks having a value greater than or equal to a value of a determined protection-level class against side-channel attacks; and
a number of the plurality of unique combinations is greater than or equal to a number of the sensitive data values, wherein a number of random mask values in the at least one set of random mask values is based on the number of the plurality of unique combinations and the value of the protection-level class of the plurality of unique combinations; and performs a cryptographic procedure, said sensitive data values comprising state bytes for rounds of the cryptographic procedure.

12. The apparatus according to claim 11 wherein the at least one set of random mask values comprises a plurality of distinct sets of random mask values.

13. The apparatus according to claim 11 wherein the cryptographic circuitry, in operation, extracts a plurality of unique combinations having a distance from one another with a value greater than or equal to the value of the determined protection-level class minus one.

14. The apparatus according to claim 11 wherein the cryptographic circuitry, in operation, uses distinct sets of random mask values for different mask positions in the unique combinations.

15. The apparatus according to claim 11 wherein the cryptographic circuitry, in operation:
divides a pool of random mask values into a number of distinct partitions greater than or equal to half the value of the determined protection-level class plus one; and
includes mask values from first, second and third distinct partitions in the unique combinations, wherein pairs of masks values from the second partition and the third partition are not reused in the unique combinations.

16. The apparatus according to claim 11 wherein the cryptographic circuitry, in operation:
divides a pool of random mask values into a number of distinct partitions greater than or equal to half the value of the determined protection-level class plus one, wherein extracting a unique combination of random mask values comprises:
selecting a mask value from the first partition to include in the unique combination;
selecting a mask value from the second partition to include in the unique combination; and
for each non-trivial partition of the distinct partitions after the first partition and the second partition, selecting a mask value in the non-trivial partition to include in the unique combination, the mask value having a position index in the non-trivial partition based on a base cyclic permutation having a cycle length equal to a prime number greater than or equal to a maximum between a size of the first partition and a size of the second partition.

17. The apparatus according to claim 11 wherein said cryptographic procedure comprises application of an Advanced Encryption Standard (AES) encryption.

18. A system, comprising:
one or more integrated circuits; and
cryptographic circuitry, which, in operation,
processes sensitive data values, the processing including:
extracting, from at least one set of random mask values, a plurality of unique combinations of random mask values, wherein at least one of the random mask values of the at least one set of random mask values is included in more than one of the plurality of unique combinations of random mask values; and
masking each sensitive data value using a respective combination of the plurality of unique combinations of random mask values, wherein:
each of the plurality of unique combinations has a protection-level class against side-channel attacks having a value greater than or equal to a value of a determined protection-level class against side-channel attacks; and
a number of the plurality of unique combinations is greater than or equal to a number of the sensitive data values, wherein a number of random mask values in the at least one set of random mask values is based on the number of the plurality of unique combinations and the value of the protection-level class of the plurality of unique combinations; and performs a cryptographic procedure, said sensitive data values comprising state bytes for rounds of the cryptographic procedure.

19. The system of claim 18 wherein one of the one or more integrated circuits includes the cryptographic circuitry.

20. The system of claim 18 wherein at least one of the one or more integrated circuits, in operation, provides set-top-box functionality.

21. The system of claim 18 wherein the cryptographic circuitry, in operation:
divides a pool of random mask values into a number of distinct partitions greater than or equal to half the value of the determined protection-level class plus one; and
includes mask values from first, second and third distinct partitions in the unique combinations, wherein pairs of masks values from the second partition and the third partition are not reused in the unique combinations.

22. The system of claim 18 wherein the at least one set of random mask values is stored in a look-up table.

23. A non-transitory computer-readable medium having contents which configure cryptographic circuitry to process sensitive data, the processing of the sensitive data comprising:
extracting, from at least one set of random mask values, a plurality of unique combinations of random mask values, wherein at least one of the random mask values of the at least one set of random mask values is included in more than one of the plurality of unique combinations of random mask values;
masking each sensitive data value using a respective combination of the plurality of unique combinations of random mask values; and
performing a cryptographic procedure, said sensitive data values comprising state bytes for rounds of the cryptographic procedure, wherein:
10each of the plurality of unique combinations has a protection-level class against side-channel attacks having a value greater than or equal to a value of a determined protection-level class against side-channel attacks; and
a number of the plurality of unique combinations is greater than or equal to a number of the sensitive data values, wherein a number of random mask values in the at least one set of random mask values is based on the number of the plurality of unique combinations and the value of the protection-level class of the plurality of unique combinations.

24. The non-transitory computer-readable medium of claim 23 wherein the plurality of unique combinations have a distance from one another with a value greater than or equal to the value of the determined protection-level class minus one.

25. The non-transitory computer-readable medium of claim 23 wherein the processing the sensitive data comprises:
dividing a pool of random mask values into a number of distinct partitions greater than or equal to half the value of the determined protection-level class plus one; and
including mask values from first, second and third distinct partitions in the unique combinations, wherein pairs of masks values from the second partition and the third partition are not reused in the unique combinations.

* * * * *